United States Patent
Miefalk et al.

(10) Patent No.: US 7,097,079 B2
(45) Date of Patent: Aug. 29, 2006

(54) AUTOMATIC DOSING DEVICE WITH A DOSING SCREW AND THE USE OF SUCH AN AUTOMATIC DOSING DEVICE

(75) Inventors: Hakan Miefalk, Jarfalla (SE); Linda Menrik, Hagersten (SE)

(73) Assignee: Electrolux Home Products Corporation N.V., Zaventem (BE)

( * ) Notice: Subject to any disclaimer, the term of this patent is extended or adjusted under 35 U.S.C. 154(b) by 192 days.

(21) Appl. No.: 10/481,837

(22) PCT Filed: Apr. 4, 2003

(86) PCT No.: PCT/SE03/00551

§ 371 (c)(1),
(2), (4) Date: Dec. 23, 2003

(87) PCT Pub. No.: WO03/093561

PCT Pub. Date: Nov. 13, 2003

(65) Prior Publication Data

US 2004/0159683 A1    Aug. 19, 2004

(30) Foreign Application Priority Data

Apr. 29, 2002 (SE) .................................. 0201314

(51) Int. Cl.
*G01F 11/02* (2006.01)

(52) U.S. Cl. ......................................... 222/431; 222/75

(58) Field of Classification Search .................. 222/75, 222/239, 241, 404, 413
See application file for complete search history.

(56) References Cited

U.S. PATENT DOCUMENTS

| | | | | |
|---|---|---|---|---|
| 2,428,995 A | * | 10/1947 | Rogers | 414/218 |
| 2,593,960 A | * | 4/1952 | Ballew | 239/666 |
| 2,988,249 A | * | 6/1961 | Wahl | 222/404 |
| 4,207,995 A | | 6/1980 | Neely | |
| 5,063,757 A | | 11/1991 | Ikeda et al. | |
| 6,033,105 A | * | 3/2000 | Barker et al. | 366/182.3 |

FOREIGN PATENT DOCUMENTS

DE    4204736 A1    10/1992
EP    1101431 A1    5/2001

* cited by examiner

*Primary Examiner*—Gene Mancene
*Assistant Examiner*—Melvin Cartagena
(74) *Attorney, Agent, or Firm*—Pearne & Gordon LLP

(57) ABSTRACT

The present invention refers to a dosing screw unit for an automatic dosing device The purpose of the automatic dosing device is to control the dosing of stored material, kept inside (29) a container (27), out of the storage. The object of the dosing screw unit according to the invention is to achieve a dosing, closing and cleaning arrangement for the automatic dosing device. The screw unit therefore comprises parts that interact with the thread of the dosing screw (1), which parts constitutes an attacher (14) that interacts with the thread and scratches of material clogged on the screw, closer that closes the outlet of the dosing unit and a director that prevents the parts from rotating around the dosing screw (1).

15 Claims, 3 Drawing Sheets

AUTOMATIC DOSING DEVICE WITH A DOSING SCREW AND THE USE OF SUCH AN AUTOMATIC DOSING DEVICE

This application claims the benefit of International Application Number PCT/SE3/00551, which was published in English on Nov. 13, 2003.

TECHNICAL FIELD

The present invention refers to a dosing screw unit for an automatic dosing device. The purpose of the automatic dosing device is to control the dosing of stored material, kept inside a container, out of the storage. The object of the dosing screw unit according to the invention is to achieve a dosing, closing and cleaning arrangement for the automatic dosing device. The screw unit therefore comprises parts that interact with the thread of the dosing screw, which parts constitutes an attacher that interacts with the thread and scratches of material clogged on the screw, a closer that closes the outlet of the dosing unit and a directer that prevents the parts from rotating around the dosing screw.

BACKGROUND OF THE INVENTION

Automatic dosing devices for different yes of machines have since long been a target for manufactures. These devices shall be able to dose powder, liquid or other kinds of material from a container into a process. Therefore a various amount of dosing devices have been developed. Mostly these devices are developed for industrial use. They are therefore often quite expensive and/or complex constructions.

Recently there has been more focus on designing automatic dosing devices for household or at least cheaper appliances. Especially for laundry washing machines there is a large interest in achieving simple and reliable devices. Conventionally, such automatic dosing devices for dispensing a detergent into a washing tub has been proposed. The detergent is stored in a container and dispensed from a discharge at the outlet of the container. In order to avoid that vibrations causes detergent to fall out from the container at other occasions than when the detergent is to be dispensed, several proposed dosing devices have a discharge mechanism which is able to both dose and close the outlet.

U.S. Pat. No. 5,063,757 proposes a detergent dispenser with this kind of dosing and closing mechanism. The dispenser includes a detergent container with a lower discharge outlet from which stored detergent is discharged and a detergent fall preventing member displaced in the outlet in order to close the outlet when detergent is not dosed. The dosing is achieved by a helical coil/screw arranged is a discharge passageway. An agitating member is disposed in the detergent container in order to avoid clogging of the detergent. The helical coil or screw and the agitating member are rotated by an electric motor mounted together with the container. The container, with an outer and inner casing, is detachably mounted to the machine by claws.

Although the construction is developed to be detachably mounted inside a machine it has drawbacks. The detaching mechanism demands a careful handling by the user. The container and other parts also have to be clean to co-operate with the machine and in order to be fixed by the claws. Since the motor is placed with the container it is more expensive to have more than one dispenser for a machine. The container is also designed such that it makes it is difficult to fit in a space inside a washing machine in a proper way. Finally it is also important to create a construction as simple and cheap as possible, which means fewer and simpler parts than in this construction.

The present invention has been made with a view toward overcoming the above drawbacks of the prior art. A first-object of the present invention is therefore to provide a dosing screw unit for an automatic dosing device that avoids humidity leaking in through the passageway in which is the screw is arranged. In order to achieve that the unit has a closer that closes the passageway outlet when the screw is not dosing. A second object of the present invention is to provide a unit that avoids clogging of material inside the passageway and on the screw. In order to avoid that the unit has a cleaner that scratches of the clogged material. A third object of the present invention is to provide a unit that is easy for the user to switch and clean. In order to achieve that the unit is detachably attached to the automatic dosing unit. A fourth object of the present invention is to achieve a cheap unit that is simple to manufacture. In order to achieve that the unit has few simple parts of cheap, reliable materials. The dosing screw unit shall mainly be designed for an automatic dosing device for a laundry washing machine, but the principle idea shall be applicable for any kind of machine that requires an automatic dosing unit. The solution of this present invention is achieved according to the features disclosed in claim 1.

According to the present invention a screw unit for dosing (dispensing) material from a container into an outlet is provided. The unit is operated by an electric motor and comprises a dosing screw, a channel interacting with the screw, a sealing with a directer, a closer and an attacher which also works as a cleaner. All these parts will be described more thoroughly in the preferred embodiment. According to the above mentioned objects of the present invention all sealing parts are formed to achieve a cheap, reliable and effective unit for cleaning and sealing in an automatic dosing unit. Accordingly the sealing unit interacts with the dosing screw for best results.

DESCRIPTION OF DRAWINGS

The invention will be described in form of a preferred embodiment by making reference to the accompanying drawings, in which.

AN ILLUSTRATIVE PREFERRED EMBODIMENT

Figure 2:
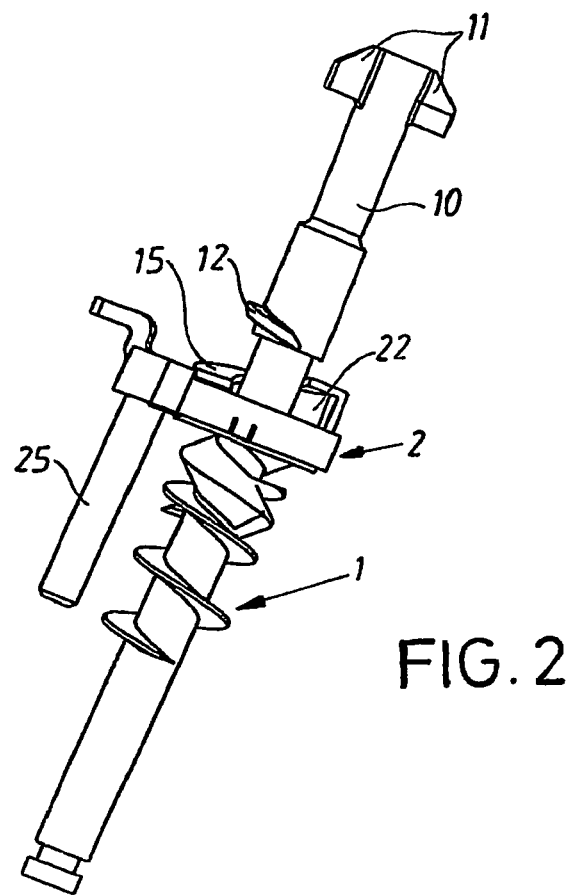
FIG. 2 is a side view of the dosing screw unit of the present invention according to FIG. 1 when being assembled.

The dosing screw unit according to the embodiment shown is directed to automatic dosing devices for laundry washing machines, whereby any reference concerning dosing material refers to detergent The dosing unit comprises a dosing screw 1 and a sealing 2. The dosing screw comprises a shaft 3, thread 4 and a groove 5. The thread covers a part of the shaft and the function of the groove is to attach the dosing screw to the automatic dosing device. The normal automatic dosing device has a channel 26 extending in the device 27, which channel through an opening 28 connects an inside 29 of a container as part of the device with an outlet 30. The dosing screw 1 when rotating inside that channel feeds the material from inside the container to the outlet. In order to achieve the best feeding conditions the thread is shaped to catch and hold the material, The thread also scratches off material clogged inside the channel. This phenomenon may occur when using special kinds of detergent.

Figure 4:
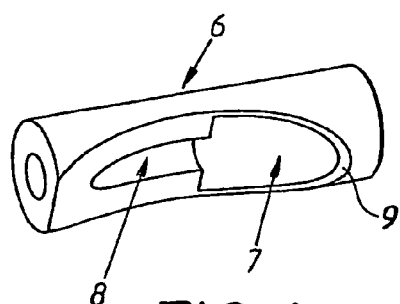
FIG. 4 is a perspective view of a channel module of the present invention unit according to FIG. 1.

In order to achieve the best interaction between the thread 4 and the channel 26, the best results are achieved if they are adapted for each other. A possible solution could be to use a special channel module 6, shown in FIG. 4, placed inside the regular channel of the automatic dosing device. The module has a wider channel area 7 with diameter at least larger than the diameter of the thread 4 on the screw 1. Tests have shown that if you increase the diameter tolerance between the channel and the screw you get better results in the effectiveness of the dosing screw. A larger diameter different result in lower needs for a strong motor to scratch and force material clogged inside the channel towards the outlet. Another way of avoiding the need for a stronger motor is to decrease the length of thread 4 on the screw. The length of the thread is such that it fits inside the wider channel area 7. There is also possible for the wider channel area to have a conical outlet in order to increase the diameter tolerance towards the outlet.

The shaft 3 of the dosing screw interacts with a narrow channel area 8 of the channel part. In order to attach the dosing screw to the channel part a part of the screw comprising the groove 5 extends out on the left side of the channel with some kind of spring attached to the grove (not shown). The channel part finally has a shape with a cutting 9 that interacts with the opening 28 to improve material fed between the inside 29 and the outlet 30.

Figure 6:
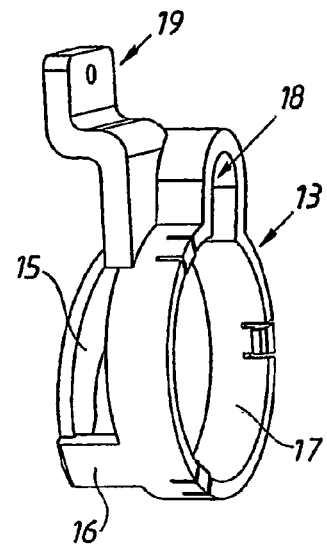
FIG. 6 is a rear perspective view of the closer of the present invention according to FIG. 1.
Figure 7:
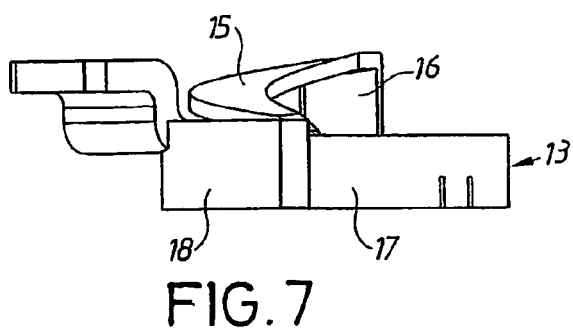
FIG. 7 is a side view of the cleaner according to FIG. 6.

The sealing 2 constitutes a closer, an attacher and a directer. The closer comprises a transmitter 10, which is in engagement with the dosing screw 1. The transmitter comprises two wings 11 by which a turning engagement is achieved between an electric motor (not shown) and the dosing screw. The transmitter also comprises a flange 12, which extends parallel to the threads 4 approximately 180 degrees around the shaft. The closer further comprises a mainly circular ramper 13 shown in FIG. 6-7. The ramper has a flexible ramp 15, which extends approximately 180 degrees about the centre of the ramper. The ramp is attached to the rest of the ramper by a support 16. The ramp part further comprises a ring 17 with a notch 18 in order to engage with the attacher and directer 14. Finally the ramper comprises a switch support 19, which together with the closer will be described further below.

Figure 5:
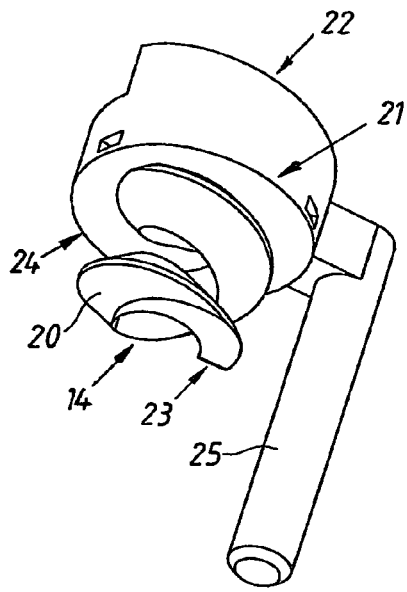
FIG. 5 is a front perspective view of the attacher and the cleaner of the present invention according to fig.

The attacher is shown in FIG. 5. It comprises a twisted piece 20 attached to a frame 21. The frame is shaped to interact into attachment with the ring 17 of the closer. The frame is further shaped with an extending piece 22, which interact with the flexing ramp 15 when the attacher is attached to the closer. The extending piece is therefore shaped to support the ramp, see FIG. 2. Further, the twisted piece is twisted approximately two turns and shaped to interact with the thread 4 of the dosing screw. It therefore has a similar thread pitch and is shaped to fit between the turns of the thread. It also has a diameter that allows the shaft 3 of the screw 1 to fit inside the twisted piece. The piece also has a sharp edge 23 and a smooth surface 24. The function of the attacher will be described further below.

The directer only comprises a pin 25 attached to the frame 21. The pin is parallel with the shaft if the dosing screw when mounted together. The function of the directer will be described further below.

In order to understand the dosing screw unit its function will know be described referring to the above mentioned information and the figures. The unit intends to be used with the channel module 6. The only part of the automatic dosing device shown is the channel 26 and the container 29, see FIG. 1. The channel and the module are mounted to achieve a feeding route for detergent between the container inside 29 and the outlet 30. The screw unit is detachably attached using the groove 5 with the spring (not shown). This detachable attachment makes it possible for the screw and channel to be cleaned by the user.

Figure 1:
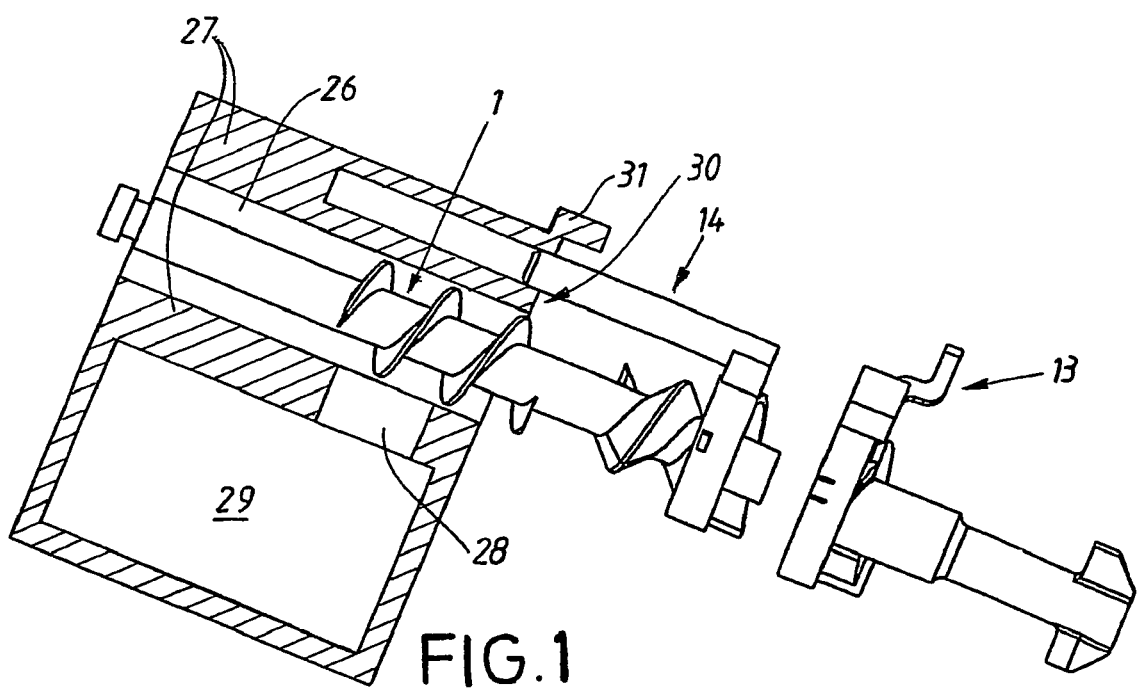
FIG. 1 is a side view of a dosing screw unit according to the present invention arranged in a channel of an automatic dosing device, the unit comprising the dosing screw together with the sealing when not being assembled.
Figure 3:
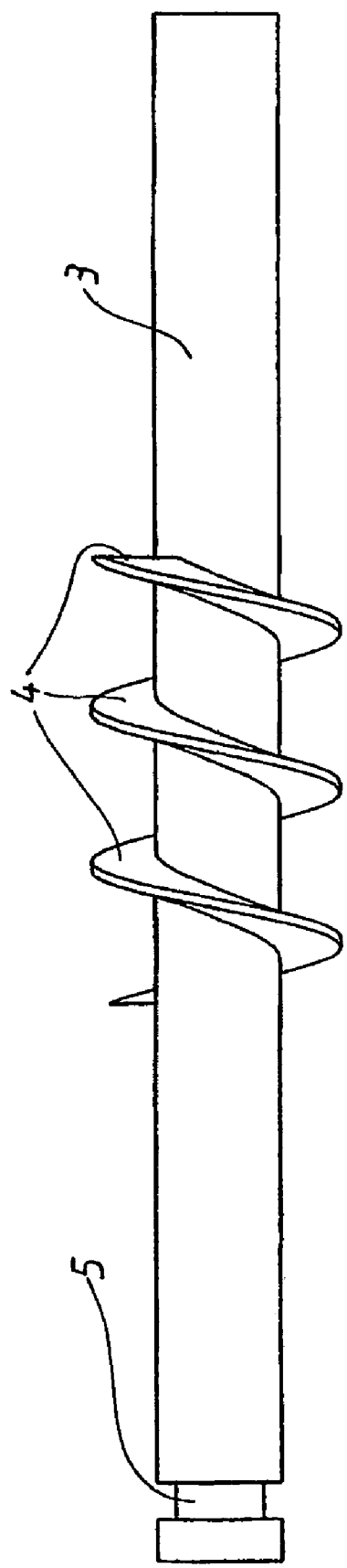
FIG. 3 is a side view of the dosing unit of the present invention according to FIG. 1.

When the parts are assembled the rotating dosing screw, rotated anti-clockwise (seen from the right in FIG. 1-2) by an electric motor, feeds detergent in a direction to the right referring to FIG. 1-2. During this rotation some parts of the ramper 13, the attacher 14 and the directer 25 are forced in the same direction if the twisted piece 20 interacts with the thread 4. When these parts reach their most right-handed position, shown in FIG. 1, the twisted piece does no longer interact with the thread.

Instead the flange 12 interacts with the flexing ramp 15, the screw still rotating anti-clockwise. As the screw rotates the flange is forced to pass between the ramp and the ring 17. The ramper 13, the attacher 14 and the directer 25 is thereby fixed in a position that corresponds to an open outlet 30 and the dosing screw 1 in this anti-clockwise rotation transports detergent. The flexing ramp 15 flexes and thereby allows the flange 12 to pass under it.

The following function solves the main objects disclosed above, the closing and cleaning. When the electric motor switches direction into clockwise, the flange 12 starts to move in the opposite direction. When it reaches the flexing ramp 15 the flange is forced up on this ramp. Since the ramp extends in a direction approximately parallel to the thread the ramper 13, the attacher 14 and the directer 25 is forced to the left with reference to FIG. 1-2. When the flange reaches the top of the flexing ramp 15 the sharp edge 23 of the twisted piece 20 has started to interact with the thread 4 of the screw 1. With reference to FIG. 2 the parts 13, 14 and 25 are forced further towards the left by the interaction between the thread and the twisted piece. During this movement the sharp edge 23 scratches of detergent clogged between the turns of the thread.

When the ramper 13, the attacher 14 and the directer 25 have reached their left position the surface 24 of the attacher closes the outlet of the channel, which is shown as the right end of the channel 6. In order to achieve a tight closing the outlet 30 should have a sharp edge. Any detergent clogged on the edge or the surface is thereby forced away when the two parts meet. Finally, when the parts move parallel to the screw the director slideably attached to the container prevents the parts from rotating around the screw 1.

In order to avoid damage of the dosing screw unit the switch support 19 in the left position activates a microswitch 31, which turns of the electric motor.

It will be appreciated by those ordinary people skilled in the art that the present invention can be embodied in other specific forms without departing from the spirit or essential character thereof. The present disclosed embodiment is therefore considered in all respect to be illustrative and not restrictive. The scope of the invention is indicated by the appended claims rather than the foregoing description, and all changes which come within the meaning and range of equivalents thereof are intended to be embraced therein.

An example thereof is the possibilities to use this kind of dosing screw unit in another machine that requires a dosing, closing and cleaning screw unit for an automatic dosing unit. Such apparatus could be dish washing machines, coffee machines and other household cleaning machines. The scope of the invention is not the machine or the automatic dosing unit in which the dosing screw is used. Instead it is the handle of material in any suitable form (granules, powder, liquid etc.) in a rough environment in order to achieve the best possible dosing result.

The invention claimed is:

1. An automatic dosing device for a machine comprising:
   a container (27) for dosing material;
   a dosing screw (1) that feeds material out from the container, wherein the screw (1) is rotatably attached to the container (27) and interacts with a channel (26) that connects an inside (29) of the container (27) with an outside of the container (27); and
   a sealing member (13,14), which by a force transmitted to the sealing member from the thread (4) of the screw (1), seals or opens an outlet (30) of the channel (26), the outlet (30) facing the container outside; wherein at least a part of the sealing member (13,14) seals and opens the outlet by moving in a first or a second direction parallel to the direction of the screw (1).

2. An automatic dosing device according to claim 1 characterized in that the sealing member (13,14) comprises a closer (10) that is attached to the screw (1), whereby when this closer (10) interacts with the member (13,14) and the screw (1) rotates clockwise the member (13,14) moves in a first direction parallel to the direction of the screw (1) and when the screw (1) rotates anti-clockwise the member (13,14) essentially does not move.

3. An automatic dosing device according to claim 2 characterized in that the closer comprises a flange (12) which extends at most half a turn around the screw (1) in a direction essentially parallel to the direction of the thread (4) on the screw (1) and which flange (12) first end, closest to the thread (4), is oriented essentially at the same angle on the turn as the end of the thread (4) closest to the flange (12).

4. An automatic dosing device according to claim 3 characterized in that the sealing member (13,14) comprises a ramper (13), which is attached to the member (13,14) and stretches in a direction essentially parallel to the direction of the flange (12) and the thread (4) on the screw (1) and which ramper (13) is made as to make it possible for the flange (12) to interact with the ramper (13) as to move the member (13,14) in the first direction.

5. An automatic dosing device according to claim 2 characterized in that the closer comprises means (11) by which a rotating motion is transferred from an electric motor to the screw, which means when transferring is in turning engagement to the motor axis.

6. An automatic dosing device according to claim 1 characterized by that the sealing member (13,14) comprises a director (25) which is attached to the member (13,14) and detachably attached to the container (27) so as to allow the member (13,14) only to move in a direction parallel to the direction of the screw (1).

7. 12 An automatic dosing device according to claim 1 characterized by that the sealing member (13,14) comprises a switch (31) arranged on the container (27) which activates when the member (13,14) seals the outlet (30), whereby this switch (31) when activated turns of the force.

8. An automatic dosing device according to claim 1 characterized by that the screw (1) comprises a notch (5) by which the screw (1) is removably attached to the container (27).

9. An automatic dosing device according to claim 1 characterized by that a channel module (6) attached or detachably attached to the channel so as to connect the inside (27) with the outside, whereby the channel module (6) is designed to interact with the screw (1).

10. Use of an automatic dosing device according to claim 1 in a washing machine, a coffee machine or any other type of machine that may require automatic dosing.

11. An automatic dosing device according to claim 1, wherein the sealing member (13,14) seals and opens the outlet via translation of at least a part of the sealing member in a direction parallel to an axis of rotation of the screw the direction of the screw (1).

12. An automatic dosing device for a machine comprising:
    a container (27) for dosing material;
    a dosing screw (1) that feeds material out from the container, wherein the screw (1) is rotatably attached to the container (27) and interacts with a channel (26) that connects an inside (29) of the container (27) with an outside of the container (27); and
    a sealing member (13,14), which by a force transmitted to the sealing member from the thread (4) of the screw (1), seals or opens an outlet (30) of the channel (26), the outlet (30) facing the container outside, wherein the sealing member (13,14) comprises an attacher (14) which is attached to the member and rotatably attached to the screw, whereby when this attacher interacts with the thread (4) on the screw (1) and the screw (1) rotates a part of the sealing member moves in as first or a second direction parallel to the direction of the screw.

13. An automatic dosing device according to claim 12 characterized in that the a part of the attacher (14) is twisted at least in part a turn around the screw (1) and has a pitch similar to the thread (4) of the screw (1), whereby the part is shaped to interact with the space between the turns of the thread (4) of the screw (1).

14. An automatic dosing device according to claim 12 characterized in that the attacher (14) does not interact with the thread (4) of the screw (1) when the channel outlet (30) is completely opened.

15. An automatic dosing device according to claim 12 characterized in that the attacher (14) is shaped as to scratch off material stuck between the thread (4) on the screw (1) when the attacher (14) interacts with the thread (4).

* * * * *